(12) United States Patent
Mosser et al.

(10) Patent No.: US 7,883,436 B2
(45) Date of Patent: Feb. 8, 2011

(54) BI-DIRECTIONAL TENSIONER

(75) Inventors: Eric S Mosser, Exton, PA (US); Francis B Fatato, Exton, PA (US)

(73) Assignee: Fenner U.S., Inc., Manheim, PA (US)

( * ) Notice: Subject to any disclaimer, the term of this patent is extended or adjusted under 35 U.S.C. 154(b) by 683 days.

(21) Appl. No.: 10/941,445

(22) Filed: Sep. 15, 2004

(65) Prior Publication Data

US 2006/0058136 A1   Mar. 16, 2006

(51) Int. Cl.
*F16H 7/08*   (2006.01)
*F16H 7/12*   (2006.01)

(52) U.S. Cl. ........................ 474/135; 474/133

(58) Field of Classification Search ................ 474/101, 474/107, 117, 112, 133–136
See application file for complete search history.

(56) References Cited

U.S. PATENT DOCUMENTS

| | | | |
|---|---|---|---|
| 2,558,311 A | 6/1951 | Morrow | |
| 3,091,947 A | 6/1963 | Thomsen | |
| 4,253,343 A | 3/1981 | Black et al. | |
| 4,285,676 A | 8/1981 | Kraft | |
| 4,309,174 A | 1/1982 | Sproul | |
| 4,458,403 A | 7/1984 | Foster | |
| 4,464,147 A | 8/1984 | Foster | |
| 4,466,803 A | 8/1984 | Wilson | |
| 4,472,162 A | 9/1984 | Hitchcock | |
| 4,473,362 A | 9/1984 | Thomey et al. | |
| 4,504,254 A | 3/1985 | Foster | |
| 4,525,152 A | 6/1985 | Speer et al. | |
| 4,536,172 A | 8/1985 | Burris et al. | |
| 4,557,709 A | 12/1985 | St. John | |
| 4,661,087 A | 4/1987 | Henderson | |
| 4,689,037 A * | 8/1987 | Bytzek | 474/135 |
| 4,822,322 A * | 4/1989 | Martin | 474/135 |
| 4,826,471 A * | 5/1989 | Ushio | 474/135 |

(Continued)

FOREIGN PATENT DOCUMENTS

DE   43 00 178   4/1994

(Continued)

OTHER PUBLICATIONS

Fenner Drives "T-Max Belt & Chain Tensioners" Brochure, published 2003.

*Primary Examiner*—Marcus Charles
(74) *Attorney, Agent, or Firm*—Stephen H. Eland; Dann, Dorfman, Herrell & Skillman (57) ABSTRACT

An assembly for maintaining tension in a drive belt features a housing mounted on a base. The housing contains a biasing element that exerts torque on the housing to bias the housing in a radial direction. A lever arm is connected to the housing and rotates with the housing in response to the bias of the biasing element. A pulley is connected to the lever arm and engages a drive belt in response to the bias force of the biasing element on the lever arm. The pulley deflects the shape of the belt to provide tension in the belt. In one embodiment, the apparatus allows the user to switch the position of the biasing element and alter the direction of torque on the lever arm. In another embodiment, the lever arm and pulley are removable from the housing and replaceable with other arms and pulleys having different configurations.

54 Claims, 6 Drawing Sheets

U.S. PATENT DOCUMENTS

| | | | |
|---|---|---|---|
| 4,886,483 | A | 12/1989 | Henderson |
| 4,906,222 | A | 3/1990 | Henderson |
| 4,934,987 | A | 6/1990 | Kadota et al. |
| 4,952,197 | A | 8/1990 | Henderson |
| 4,957,471 | A | 9/1990 | St. John |
| 4,971,589 | A | 11/1990 | Sidwell et al. |
| 4,985,010 | A | 1/1991 | Henderson |
| 5,015,217 | A | 5/1991 | Henderson |
| 5,030,172 | A | 7/1991 | Green et al. |
| 5,131,889 | A * | 7/1992 | Meckstroth et al. ......... 474/117 |
| 5,370,586 | A | 12/1994 | Thomsen et al. |
| 5,470,279 | A | 11/1995 | Brandenstein et al. |
| 5,496,221 | A | 3/1996 | Gardner et al. |
| 5,575,726 | A | 11/1996 | Gardner et al. |
| 5,718,649 | A | 2/1998 | Hong et al. |
| 5,795,257 | A | 8/1998 | Giese et al. |
| 5,803,849 | A | 9/1998 | Ayukawa |
| 5,918,717 | A | 7/1999 | Fohl |
| 5,919,107 | A | 7/1999 | Stepniak |
| 5,964,674 | A | 10/1999 | Serkh et al. |
| 5,983,145 | A | 11/1999 | Becker |
| 6,217,471 | B1 | 4/2001 | Brandsma et al. |
| 6,231,465 | B1 | 5/2001 | Quintus |
| 6,565,468 | B2 | 5/2003 | Serkh |
| 6,575,860 | B2 | 6/2003 | Dutil |
| 6,582,332 | B2 * | 6/2003 | Serkh ..................... 474/135 |

FOREIGN PATENT DOCUMENTS

| | | |
|---|---|---|
| EP | 0482382 | 4/1992 |
| EP | 0709595 | 5/1996 |
| JP | 63-308259 | 12/1988 |
| JP | 03-163245 | 7/1991 |
| JP | 04-347043 | 12/1992 |
| JP | 06-280950 | 10/1994 |
| JP | 07-103296 | 4/1995 |
| WO | 97/07584 | 2/1997 |

* cited by examiner

BI-DIRECTIONAL TENSIONER

FIELD OF THE INVENTION

The present invention relates generally to tensioners, and more specifically to mechanical spring-actuated or biased tensioners for use in continuously maintaining tension in endless drive belts or chains in power transmission drive systems.

BACKGROUND OF THE INVENTION

A variety of tensioners are known in the art for tensioning power transmission drives, such as belts. However, the known tensioners are not modular or adaptable to various applications. Therefore, a different tensioner must be designed for each application or the application must be tailored to the available tensioners. Furthermore, may of the known tensioners are not sufficiently robust to accommodate the loads of certain applications.

SUMMARY OF THE INVENTION

To overcome the shortcomings of the prior art tensioners, the present invention provides a tensioner that is readily adaptable to a variety of different applications. Accordingly, the present invention provides a tensioner having a housing having a first connector on the housing and an arm having a second connector that is cooperable with the first connector to attach the arm to the housing. A reversible biasing element disposed within the housing is operable to bias the arm in a first direction. A base is cooperable with the housing to enclose the biasing element, wherein the base has a first shaft connector. A shaft extends through the housing and the biasing element. The shaft has a bore and a second shaft connector configured to cooperate with the first shaft connector to impede relative rotation of the shaft relative to the base.

The present invention also provides a tensioner having a housing and an arm releasably connectable with the housing. A biasing element disposed within the housing operable to bias the arm in a first direction. A base is cooperable with the housing to enclose the biasing element. A shaft extends through the housing and biasing element. The shaft has a bore and a first end configured to mate with the base to impede rotation of the shaft relative to the base while allowing axial displacement of the shaft relative to the base.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE PREFERRED EMBODIMENTS

Figure 1:
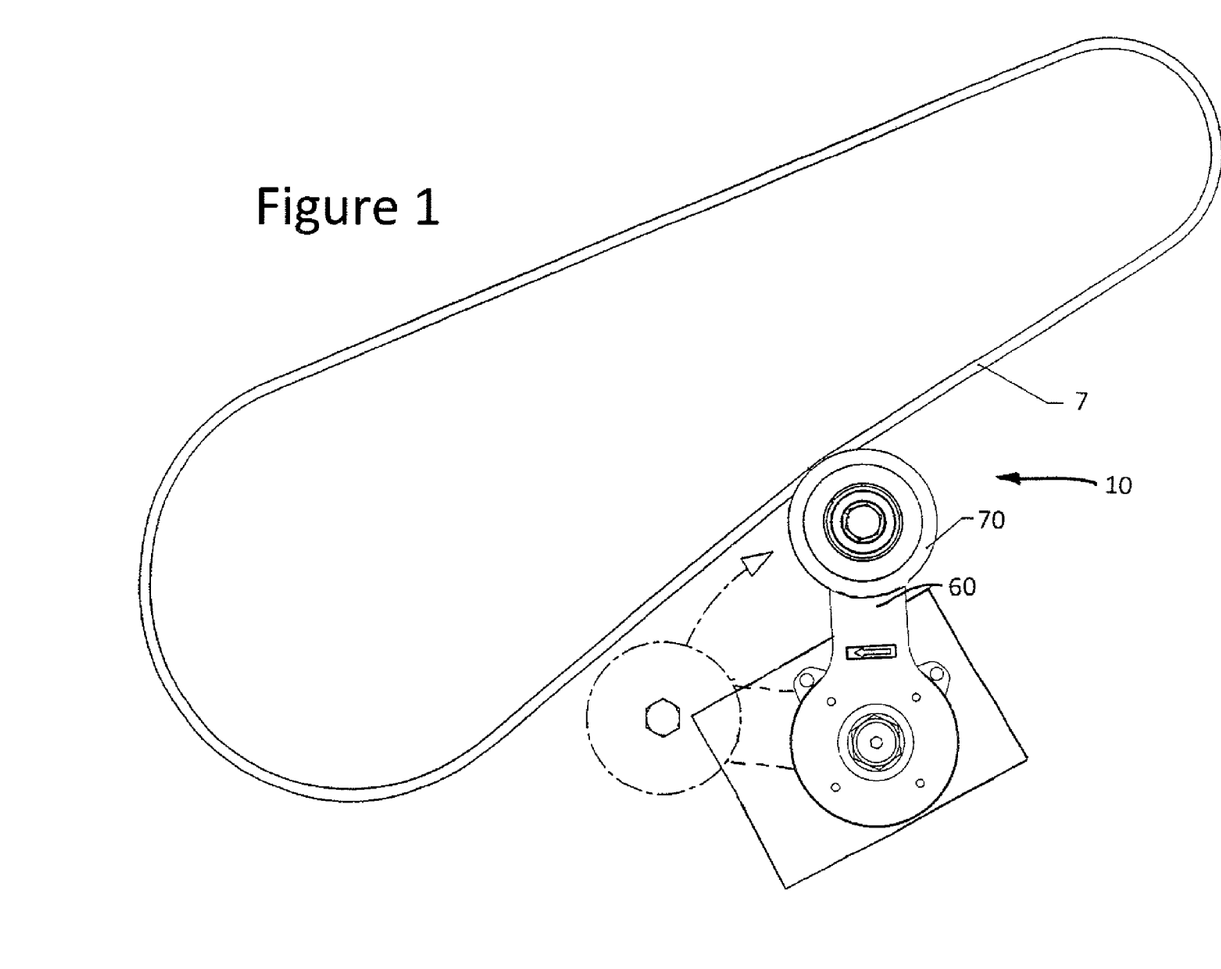
FIG. 1 is a diagram of a typical application, including a belt, tensioner assembly and idler pulley.
Figure 2:
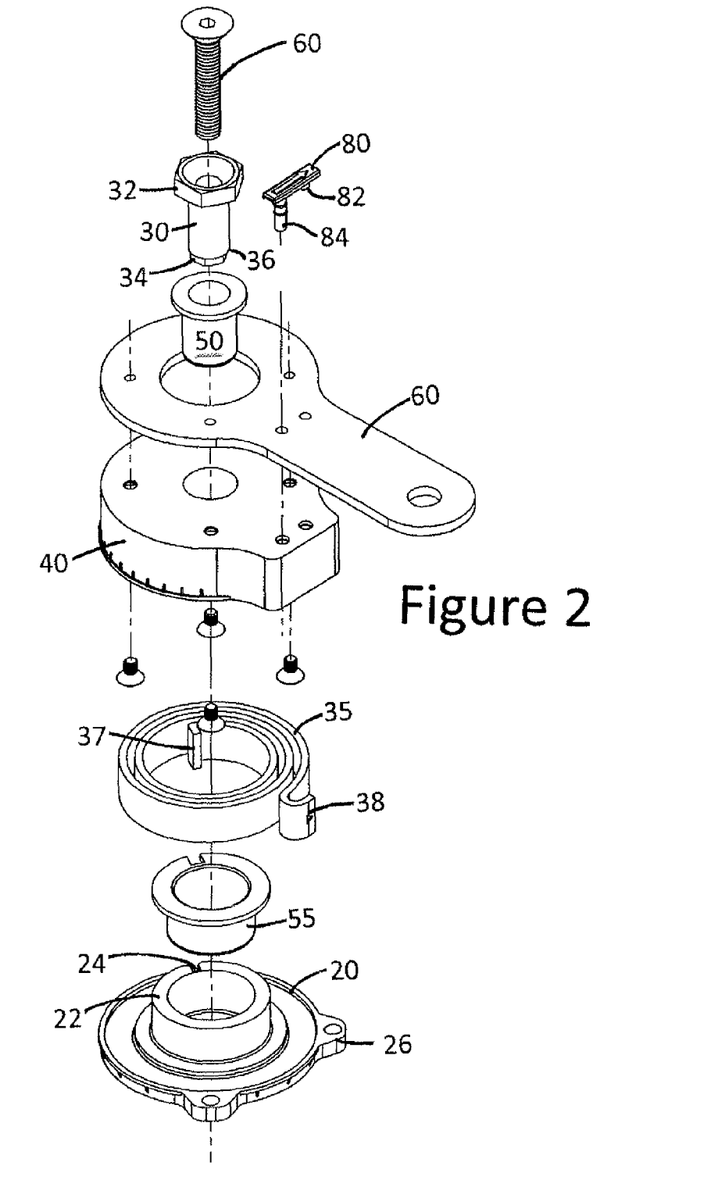
FIG. 2 is an exploded perspective view of a belt tensioner assembly.
Figure 3:
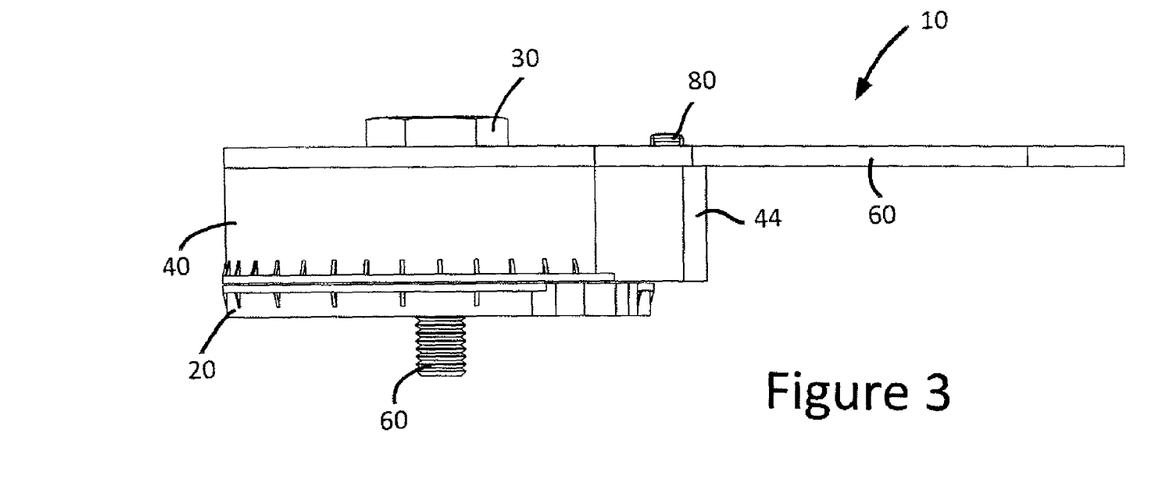
FIG. 3 is a side elevation view of the tensioner illustrated in FIG. 2.

Referring now to the drawings in general, and to FIGS. 1 and 2 specifically, a tensioner apparatus is generally designated 10. The tensioner 10 biases an idler pulley 70 into engagement with a belt 7. The tensioner 10 includes an arm 60 removably attached to a housing 40. The arm 60 and housing 40 pivot together relative to a base and are under bias from a biasing element 35 in the housing 40. The pulley 70 is connected to the end of the arm 60 and engages the belt 7 to apply tension to the belt under the bias from the biasing element 35.

The tensioner 10 has a modular construction that allows the housing 40 to be readily assembled with arms 60 and pulleys 70 having a variety of sizes. As such, the tensioner 10 may be provided as an assembly or kit which comprises a biasing element 35, a housing 40, and a variety of lever arms 60 and pulleys 70 having different sizes. Depending on the application, a lever arm 60 and pulley 70 having appropriate dimensions may be selected and connected to the housing 40.

The modular construction of the tensioner 10 permits easy disassembly and access to the biasing element 35. Referring to FIG. 2, the tensioner 10 comprises a torsion spring 35. The spring 35 is readily removable from the housing 40 and can be reinserted in an opposite or reverse configuration to change the direction of the bias exerted on the housing 40.

Figure 5:
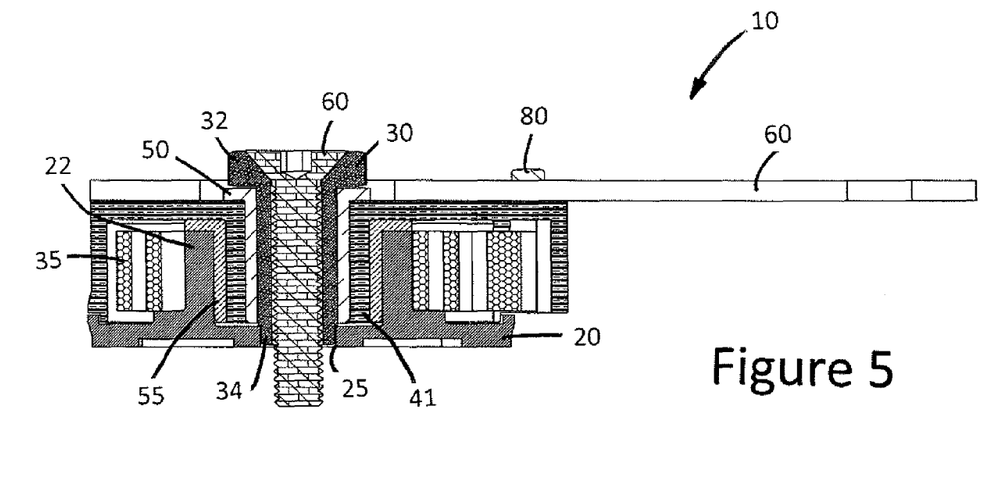
FIG. 5 is a cross sectional view of the tensioner of FIG. 4 taken along the line 5-5.
Figure 6:
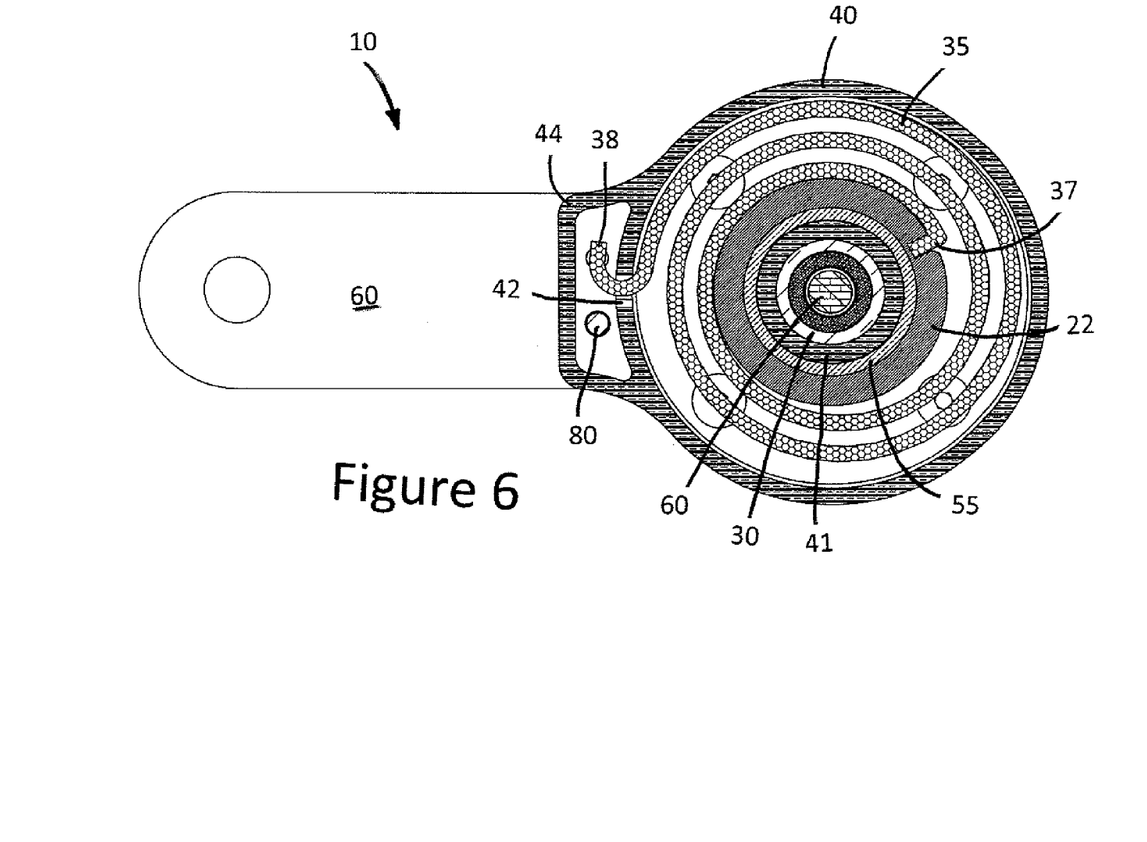
FIG. 6 is a sectional view of the device in FIG. 3 taken along the line 6-6.

Referring now to FIGS. 2, 5 and 6, the details of the tensioner will be described in greater detail. The tensioner includes a base 20 that is generally circular. As shown in FIG. 2, the base may include a pair of ears 26 projecting outwardly. Each ear 26 comprises a hole that can be used to pin the base 20 to a machine element to locate the tensioner 10 on the machine element.

The base 20 also includes a central boss or hub 22 projecting upwardly. The hub 22 is generally cylindrical is hollow, forming a cavity. A vertical slot 24 extends along the height of the hub, preferably on the outer surface of the housing. Additionally, as shown in FIG. 2, a circular recess or groove extends around the top surface of the base, adjacent the perimeter of the base. The bottom of the base 20, within the hub 22, includes a central opening 25. The shaft projects into the opening 25, and a fastener 60 extends through the shaft, and through the opening, as discussed further below.

The spring 35 is a spiral spring formed from a long piece of rectangular steel that is formed in a spiral fashion to create a plurality of overlapping convolutions. The inner end 37 of the spring 35 forms a tongue that is inserted into the slot 24 in the hub 22 of the base 20. The outer end 38 of the spring 35 also forms a tongue, which engages the housing 40 as described further below. The inner convolutions of the spring 35 have a diameter that is larger than the outer diameter of the hub 22 so that the spring is disposed around the hub 22, as shown in FIG. 6.

The housing 40 is generally cylindrical, preferably having a height that is less than its diameter. The housing 40 operates as a cap over the base, which encloses the spring 35. Accordingly, the housing is generally cylindrical, having an open lower end and a generally closed top end. The top end includes a central opening for receiving the shaft 30. A hollow cylindrical hub 41 projecting downwardly from the central opening in the top surface of the housing.

As shown in FIG. 6, the housing 40 may also include a pocket 44 extending outwardly. A slot 42 extends through the sidewall of the housing adjacent the pocket. The slot 42 is cooperable with the outer end 38 of the spring 35 to connect the spring to the housing 40. The pocket 44 encloses the end of the spring 35 and the slot 42 and forms a solid wall that strengthens the housing.

The housing 40 is configured for connecting the arm 60 to the housing. Specifically, the arm 60 comprises a first end configured to overlay the top of the housing 40. The housing and the arm include elements for connecting the arm to the housing. For instance, the first end of the arm may include a plurality of threaded holes that align with a plurality of holes in the top of the housing. In this way, the arm may be releasably connected to the housing by inserting a plurality of screws through the holes in the top of the housing so that the screws threadedly engage the threaded holes in the arm.

The housing 40 and the attached arm pivot about the shaft 30, which is connected to the base 20. The shaft is generally cylindrical, having a first end that forms an enlarged diameter head 32 and a second end 34 configured to cooperate with the opening 25 in the bottom of the base 20. The enlarged head 32 may be configured to cooperate with a tightening tool, such as a wrench, so that the tensioner can be easily rotated to increase the bias in the tensioner. Accordingly, in the present embodiment the enlarged head 32 is configured as a hex head, having opposing parallel flat surfaces that easily cooperate with a standard box wrench. However, the head of the shaft can be formed into any of a variety of shapes, preferably one that can be easily grasped by a tool to rotate the shaft.

It is desirable to connect the shaft to the base in a manner that impedes rotation of the shaft relative to the base. In this way, rotating the shaft operates to rotate the base. Furthermore, it is desirable to connect the shaft with the base in a manner that allows the shaft to be readily removed from the base so that the tensioner can be disassembled. Accordingly, in the present embodiment, the end 34 of the shaft is configured to engage the base 20. More specifically, the end has a non-circular configuration, such as a hexagonal configuration, and the opening 25 in the base is similarly configured so that the end of the shaft mates with the opening in the base.

The shaft is hollow, having a central bore, and the length of the shaft between the head 32 and the end 34 is generally cylindrical. A shoulder 36 is formed in the shaft adjacent the end 34. The shoulder 36 abuts the base 20 when the shaft end 34 is inserted in the opening 25 in the base. In this way, the shoulder operates as a stop limiting the distance that the shaft can be inserted into the housing.

The bore of the shaft 30 is configured to receive a fastener 60 that is operable to attach the tensioner 10 to a machine element. In the illustrated embodiment, the fastener is a bolt with a flat head. The bore of the shaft is larger than the bolt 60 and the length of the fastener extends through the shaft without interfering with the bore of the shaft in addition, it may be desirable to configure the shaft so that the head of the bolt mates with the head of the shaft. For instance, as shown in FIG. 5, the head of the shaft is countersunk to provide a tapered interior surface into which the head of the bolt mates. In this way, the bolt does not protrude from the top of the shaft, thereby reducing the overall height of the device.

In addition, preferably the head of the bolt 60 includes a surface that mates with a wrench. For instance, in the illustrated embodiment, the bolt 60 includes an internal hex socket configured to cooperates with a hex wrench.

In the foregoing description, the shaft is described as having a hollow bore. However, it may be desirable to use a shaft 30 having a threaded bore so that the fastener 60 can thread into the shaft, such as through the base 20 and into the shaft, in order to attach the tensioner to a machine element. Further, although the fastener has been described as a flat head bolt having a hex socket, the fastener can be any of a variety of types of fasteners. For instance, the fastener 60 can be a hex head bolt that protrudes upwardly from the shaft, so that the tensioner can be tensioned and tightened by engaging the shaft head 32 with a first wrench and the fastener 60 head with a second wrench, as discussed further below.

The tensioner 10 operates such that the spring 35 is connected to the housing 40 and the base 20, and the base is maintained stationary while the housing pivots about the shaft 30 in response to the load on the item being tensioned. To improve the pivoting motion of the tensioner, it may be desirable to include bushings between the various elements. For instance, as illustrated in FIGS. 2, 5 and 6, the present embodiment includes a shaft bushing 50 disposed between the shaft and the housing hub 41. The shaft bushing 50 is positioned over the shaft 30 so that the shaft bears against the interior of the shaft bushing. The shaft bushing is configured to mate with the interior of the housing hub 41, so that the interior of the housing hub bears against the external surface of the shaft bushing. In this way, the shaft bushing provides a smooth wear surface with a relatively low coefficient of friction so that the housing can pivot smoothly relative to the shaft.

The shaft bushing 50 may be a simple cylindrical liner. However, it may be desirable to utilize a bushing having a flared head, as shown in FIGS. 2 and 5. Specifically, the shaft bushing 50 may include a head that flares outwardly so that the head of the shaft bushing is disposed between the top surface of the housing and the bottom surface of the flared head 32 of the shaft 30. Configured in this way, the shaft bushing also provides a smooth wear surface with a relatively low coefficient of friction between the head of the shaft and the top surface of the housing 20.

In addition to the shaft bushing 50, it may be desirable to include a base bushing 55 to provide a smooth wear surface between the housing 40 and the base 20. Referring to FIGS. 2, 5 and 6, the base bushing is configured to be positioned within the hub 22 of the base 20, so that the external surface of the bushing confronts the interior surface of the base hub 22. More specifically, in the illustrated embodiment, the base bushing is configured to form an interference fit with the hub of the base, so that the bushing does not move relative to the base. The base bushing 55 is also configured to fit over the central hub 41 of the housing 40. Specifically, the interior cylindrical surface of the base bushing 55 confronts the external cylindrical surface of the housing hub 41. In this way, the base bushing provides a wear surface having a relatively low coefficient of friction between the housing and the base to provide a long lasting smooth pivoting action between the base and the housing.

Similar to the shaft bushing 50, the base bushing 55 may be a simple cylindrical liner type of bushing. However, it may be desirable to use a bushing having a flared head, as shown in FIGS. 2 and 5. The flared head projects outwardly from the cylindrical body of the base bushing 55, and is disposed between the inside surface of the top of the housing and the top of the base hub 22. In this way, the flared head provides a smooth wear surface between the top of the housing 40 and the top of the base hub 22.

The base bushing 55 and shaft bushing 50 are formed from materials that are softer and/or smoother than the material from which the base, housing and shaft are formed. In this way, the base, shaft and housing can be formed from materials with less regard to wear durability. For instance, the base and housing may be formed of aluminum, the shaft may be formed of steel, and the shaft bushing 50 and base bushing 55 may be formed of bronze.

Configured as described above, the tensioner 10 is assembled as follows. The base bushing 55 is press fit into the central hub 22 of the base. As shown in FIG. 2, the flared head of the base bushing 55 includes a notch that aligns with the slot 24 in the side of the base hub 22. As shown in FIG. 6, the spring 35 is placed over the base hub so that the spring wraps around the base hub, with the inner end 37 of the spring engaging the slot in the base hub. The arm is attached to the housing 40 by inserting the fastening screws 48 through the holes in the top of the housing and then into the threaded holes in the arm.

After the arm 60 is attached to the housing 40, the housing is positioned over the base 20 so that the central hub 41 of the housing is disposed within the interior of the base bushing 55. In the present embodiment, the shaft bushing 50 is press fit into the interior of the central hub 41 before the housing is placed over the base. Alternatively, the shaft bushing may be simply inserted into the bore of the central hub. The shaft 30 is then inserted into the shaft bushing so that the hex-shaped end 34 of the shaft engages the hex shaped opening 25 in the bottom of the base. The shaft 30 is inserted into the bushing until the shoulder 36 adjacent the end of the shaft abuts the bottom of the base, limiting the further insertion of the shaft. The fastener 60 is then inserted through the shaft and threaded into the machine element to assemble the tensioner together and to attach the tensioner to the machine element. When the fastener tightens down against the shaft 30, the fastener draws the shaft up against the top of the shaft bushing and the top of the housing. However, to operate most efficiently, the housing should be free to pivot relative to the shaft. Therefore, it is desirable to limit the axial force transferred from the fastener to the top of the housing. Accordingly, as illustrated in FIG. 5, the length of the shaft 30 from the shoulder 36 of the shaft to the bottom of the enlarged head of the shaft is equal to or slightly larger than the distance from the bottom of the base hub 22 to the top of the flared head of the shaft bushing 50. In this way, the shaft may operate as a spacer to limit the axial engagement between the shaft and the top of the shaft bushing when the housing is assembled. Alternatively, the shaft busing 50 may be sufficiently long so that the length from the bottom of the bushing flared head to the end of the bushing is longer than the distance from the bottom of the base hub 22 to the top of the housing. In this way, the shaft bushing may operate as a spacer to limit the axial force transferred to the housing when the fastener is tightened.

As described above, the housing 40 is mounted over the base 20 by the fastener 60 extending through the shaft and threading into a machine element. Alternatively, as described above, the bore of the shaft 30 may include a threaded portion, such that the shaft may be threaded onto a fastener attached to the machine element to attach the tensioner to the machine element, which in turn would hold the tensioner assembly together.

The tension provided by the tensioner 10 can be easily adjusted as desired for the particular application. To do so, the fastener is loosened so that the base can be rotated relative to the machine element. The tensioner is then rotated until the pulley 70 on the end of the arm 60 engages the element being tensioned, which in the present example is a belt 7. After the pulley 70 engages the belt 7, the belt will retain the arm 60 and the attached housing 40 in a generally fixed position. To increase the tension, the base is rotated further so that the base is rotated relative to the housing, thereby increasing the bias in the spring 35.

The base 20 may be rotated by rotating the shaft. Specifically, a wrench may be used to engage the enlarged head 32 of the shaft. Then, using the wrench to turn the shaft also turns the base. After the appropriate amount of tension is applied to the belt, the fastener 60 is tightened while the shaft is retained in position. In other words, after rotating the shaft into a position corresponding to the appropriate tension, the shaft is held in position to retain the tension by the wrench that was used to turn the shaft. While the shaft is held in position by the first wrench, a second wrench is used to tightened the fastener, which thereby locks the base and the shaft in position. In this way, the tension in the tensioner can be easily adjusted using two standard tools and without disassembling the tensioner.

Preferably, the biasing element is reversible so that it can provide a bias in a first direction when it is attached one way, and in a second direction when it is attached in a second way. Specifically, when the spring 35 is attached to the housing and the base so that the convolutions run in the direction shown in FIG. 6, the device is operable to provide a clockwise torsional bias (relative to the perspective of FIG. 6) when the housing is turned in a counter-clockwise direction. By flipping the torsion spring over, so that the convolutions run in the opposite direction, the device is operable to provide a counter-clockwise torsional bias when the housing is turned in a clockwise direction.

Further, the tensioner is configured and assembled so that the tensioner can be easily disassembled so that the biasing element can be reversed after the tensioner is assembled. Specifically, to reverse the spring 35, the fastener 60 is disengaged from the machine element so that the shaft 30, shaft bushing 50 and housing 40 can be removed from the base 20. The spring 35 is then removed from the base and flipped over. In other words, the bottom of the spring, which was engaging the base is flipped up so that is does not engage the base. The inner end 37 of the spring 35 engages the vertical slot 24 in the base hub 22, and the device is then re-assembled as described previously.

Since the biasing element 35 is reversible, it may be desirable to include an indicator 80 for indicating which direction to turn the shaft to provide a bias. Various elements can be used as an indicator. Preferably, the indicator includes an element with a graphical element, such as an arrow or other element indicating the proper direction for turning the housing to provide a bias.

Referring to FIG. 2, the indicator 80 has two legs or pins, a short pin 82 and a longer pin 84. The pins are configured to cooperate with two holes in the arm 60, which are aligned with two holes in the housing 40. The holes in the arm and the housing are positioned over the pocket 44 in the housing so that the pins 82, 84 on the indicator project into the pocket 44.

It is desirable to have the indicator 80 cooperate with a portion of the spring 35 so that the orientation of the spring dictates the orientation of the indicator. Specifically, preferably the indicator 80 and pocket 44 are formed so that the tongue 38 of the spring interferes with the indicator when the indicator is inserted in the wrong orientation so that the indicator cannot be improperly inserted into the pocket.

Figure 4:
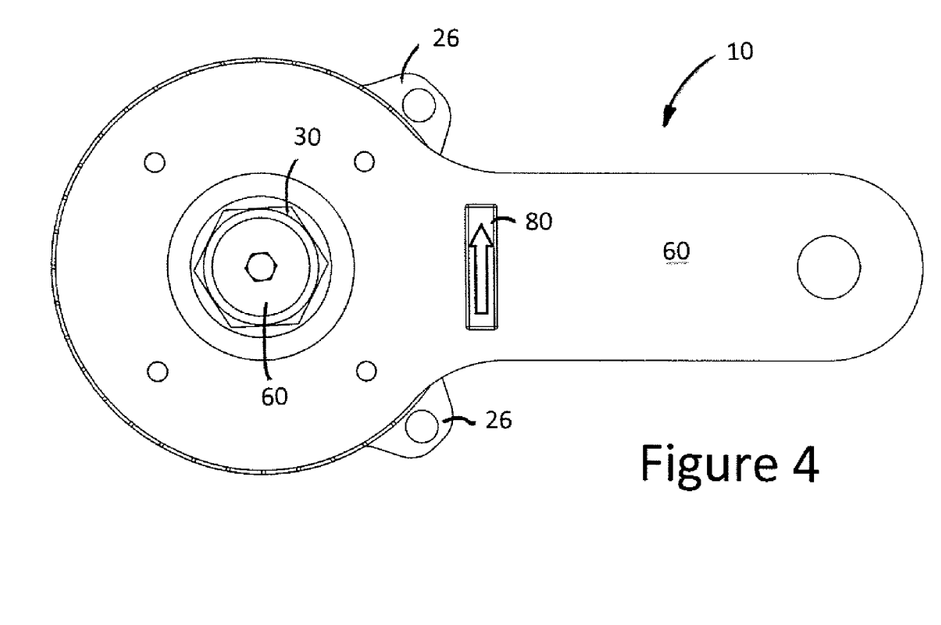
FIG. 4 is a plan view of the tensioner shown in FIG. 2.

In this way, when the spring is oriented so that the housing should be turned counter-clockwise to provide torsion, the indicator is inserted through the holes in the arm and housing, and into the pocket to show that the housing should be rotated in a counter-clockwise manner, as shown in FIGS. 4 and 6. In this orientation, the short arm 82 of the indicator is aligned with the tongue 38 on the end of the spring. If one attempts to insert the indicator in the opposite orientation, the long pin 84 interferes with the spring end 38 so that the indicator can not be completely inserted into the pocket. Similarly, if the spring is reversed, the tongue will project into the pocket so that the indicator will need to be reversed.

Additionally, it may be desirable to lock the indicator in place so that it cannot fall out or be accidentally removed. Accordingly, it may be desirable to include a locking element, such as a barb or a rib on the pins on the indicator. The rib may be formed on either or both of the pins 82, 84. In this way, when the indicator is inserted into the pocket, the ribs engage the underside of the top of housing to prevent the indicator from being removed from the pocket.

The tensioner assembly 10 may be attached to the frame of a device or onto a mounting assembly attached to a device. Referring to FIG. 1, the tensioner assembly 10 is assembled so as to engage the belt in the position shown ("engaging position"). Before the belt 7 is assembled, the tensioner assembly 10 would typically be assembled with the arm 60 pivoted into a position rotated approximately 90 degrees from the engaging position (such as that shown in phantom lines). This position ("relaxed position") would not have any biasing load generated by the spring 35 because there would be no deflection in the spring.

When the belt is assembled, the tensioner arm 60 is rotated to the engaging position. During rotation of the arm 60, the housing 40 rotates in a radial direction around the pivot axis. By rotating the housing 40, the outer end 38 of the spring 35 moves in a radial direction because of its connection with the slot 46 in the housing 40. The inner end 37 of the spring remains fixed in contact with the slot 24 in the base 20 while the outer end 38 moves radially. As a result, movement of the outer end 38 of the spring 35 relative to the inner end 37 causes deflection in the spring. The deflection in the spring 35 generates a load which is resisted by a bias force exerted by the spring. In general, the bias force in the spring is proportional to the amount of deflection caused by rotation. The bias force is transferred through the lever arm 60 to the idler pulley 70 at the end of the arm. The idler pulley 70, in turn, pushes on the belt 7 and deflects the shape of the belt. The deflection of the belt removes the slack in the belt.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. For instance, in the foregoing description, the tensioner includes a pair of bushings to improve the interface between the shaft, base and housing. In certain applications it may desirable to utilize bearing elements that incorporate ball bearing. Similarly, rather than using a separate bushing, the elements could be plated or coated with a material that provides the desired wear surface. Accordingly, the term bearing element for the shaft, base or housing is meant to include any type of liner, bushing, ball bearing, plating or coating, which provides a property or characteristic separate from the material from which the corresponding element (i.e. the shaft, base or housing) is formed. Further, the indicator has been described above as a removable element having a direction indicator printed or molded onto it. Alternatively, the directional indicator could be printed or molded onto the housing and a moveable element could cover a portion of the directional indicator depending on the orientation of the element. For instance, two arrows could be printed on the housing, one pointing in a clockwise direction, one pointing in a counter-clockwise direction. The moveable element can be configured so that in one orientation it covers the clockwise arrow, and in a second orientation it covers the counter-clockwise orientation. In yet another alternative, the moveable element could be eliminated and the indicator could be applied directly onto the spring, so that on one side of the tongue an arrow is applied directly onto the spring pointing in a first direction, and on the other side of the spring an arrow is applied pointing in the opposite direction. A still further alternative indicator comprises a directional indicator molded or printed onto the housing beneath the area where the tongue projects. In this alternative, the tongue covers up a portion of the directional indicator depending on the orientation of the spring. For instance, two opposite arrows could be printed or molded into the pocket 42. When the spring is in a first orientation, the tongue covers the second arrow, but leaves the first arrow exposed, so that the user can see the first arrow, which would thereby indicate the proper direction to turn the housing to provide tension. Similarly, when the spring is in a second orientation the tongue covers the first arrow, but leaves the second arrow exposed so that the user can see the second arrow. Accordingly, the invention incorporates variations that fall within the scope of the following claims.

We claim:

1. A tensioner for tensioning a belt, comprising:
   a housing having a first connector on the housing;
   an arm having a second connector that is cooperable with the first connector,
      wherein the arm is connected to the housing by the first and second connector;
   a reversible biasing element disposed within the housing operable to bias the arm in a first direction;
   a reversible indicator operable to identify the direction of the bias of the biasing element, wherein the indicator is releasably connectable with the arm or the housing;
   a base cooperable with the housing to enclose the biasing element, wherein the base has a first shaft connector;
   a shaft extending through the housing and biasing element, wherein the shaft has a bore and a second shaft connector configured to cooperate with the first shaft connector to impede rotation of the shaft relative to the base, wherein the shaft has one or more flat surfaces for engagement by a wrench to rotate the tensioner to increase the tension in the tensioner.

2. The tensioner of claim 1 wherein the biasing element is operable in first and second orientations, wherein in the first orientation the biasing element biases the arm in a clockwise direction and in the second orientation the biasing element biases the arm in a counter-clockwise direction.

3. The tensioner of claim 1 wherein the first and second shaft connectors are configured to permit axial displacement of the shaft relative to the base, while impeding rotation of the shaft relative to the base.

4. The tensioner of claim 1 wherein the shaft bore is configured to receive a bolt for attaching the tensioner to a machine element.

5. The tensioner of claim 1 wherein the second shaft connector is on a second end of the shaft.

6. The tensioner of claim 5 wherein the shaft comprises a first end remote from the second end, wherein the flat surfaces are adjacent the first end and wherein the flat surfaces are parallel flat surfaces.

7. The tensioner of claim 6 wherein the first end of the shaft comprises a pair of opposing parallel flat surfaces cooperable with a wrench to turn the shaft to tighten the tensioner.

8. The tensioner of claim 1 wherein a first end of the biasing element is releasably connected with the base and a second end of the biasing element is releasably connected with the housing.

9. The tensioner of claim 1 comprising a bearing element between the shaft and the housing to provide a low friction bearing surface between the shaft and the housing.

10. The tensioner of claim 9 comprising a second bearing element disposed between the housing and the base to provide a low friction bearing surface between the housing and the base.

11. The tensioner of claim 9 wherein the bearing element is a bushing.

12. The tensioner of claim 10 wherein the second bearing element is a bushing.

13. The tensioner of claim 1 wherein the arm is releasably connectable with the housing.

14. The tensioner of claim 1 wherein the indicator is cooperable with the biasing element to determine the proper orientation of the indicator.

15. The tensioner of claim 1 wherein the base comprises a cylindrical hub projecting upwardly and the biasing element circumscribes the hub.

16. The tensioner of claim 15 wherein the biasing element comprises a first end connected to the hub.

17. The tensioner of claim 1 wherein the arm comprises an opening and the shaft extends through the opening in the arm.

18. A tensioner for tensioning a belt, comprising:
a housing;
an arm releasably connectable with the housing;
a biasing element disposed within the housing operable to bias the arm in a first direction;
a base cooperable with the housing to enclose the biasing element, wherein the base comprises a first connector;
a shaft extending through the housing and biasing element, wherein the housing is rotatable relative to the shaft and the shaft has a bore and a second connector configured to mate with the first connector of the base to impede rotation of the shaft relative to the base while allowing axial displacement of the shaft relative to the base; and
wherein the first connector and the second connector comprise non-circular configurations.

19. The tensioner of claim 18 comprising a fastener extending through the shaft for attaching the tensioner to a machine element.

20. The tensioner of claim 19 wherein the shaft comprises a second end having a surface adapted to cooperate with the fastener, such that tightening the fastener tightens the shaft against the base, which in turn tightens the base against the machine element.

21. The tensioner of claim 20 wherein the shaft comprises a stop for limiting the axial displacement of the shaft toward the base.

22. The tensioner of claim 21 wherein the shaft is configured such that upon tightening the fastener against the shaft, a gap remains between the second end of the shaft and the housing to permit rotation of the housing relative to the shaft.

23. The tensioner of claim 18 wherein the shaft comprises a second end configured to cooperate with a tool for tightening the tensioner.

24. The tensioner of claim 23 wherein the second end of the shaft comprises a pair of opposing parallel flat surfaces cooperable with a wrench to turn the shaft to tighten the tensioner.

25. The tensioner of claim 18 comprising a bearing element between the shaft and the housing to provide a low friction bearing surface between the shaft and the housing.

26. The tensioner of claim 25 wherein the bearing element is a bushing.

27. The tensioner of claim 25 comprising a second bearing element disposed between the housing and the base to provide a low friction bearing surface between the housing and the base.

28. The tensioner of claim 27 wherein the second bearing element is a bushing.

29. The tensioner of claim 1 wherein the first shaft connector comprises a socket having a non-circular configuration and the second shaft connector has a cooperation non-circular configuration.

30. A tensioner for tensioning a belt, comprising:
a housing;
an arm releasably connected with the housing;
a biasing element disposed within the housing operable to bias the arm in a first direction;
a base releasably connected with the housing and cooperable with the housing to enclose the biasing element, wherein the base comprises a first connector;
a shaft extending through the housing and biasing element, wherein the shaft has a bore and a second connector configured to mate with the first connector of the base to impede rotation of the shaft relative to the base while allowing axial displacement of the shaft relative to the base; and
wherein the first connector and the second connector comprise non-circular configurations.

31. The tensioner of claim 30 wherein the shaft comprises a second end configured to cooperate with a tool for tightening the tensioner.

32. The tensioner of claim 31 wherein the second end of the shaft comprises a pair of opposing parallel flat surfaces cooperable with a wrench to turn the shaft to tighten the tensioner.

33. The tensioner of claim 30 comprising a bearing element between the shaft and the housing to provide a low friction bearing surface between the shaft and the housing.

34. The tensioner of claim 33 wherein the bearing element is a bushing.

35. The tensioner of claim 33 comprising a second bearing element disposed between the housing and the base to provide a low friction bearing surface between the housing and the base.

36. The tensioner of claim 35 wherein the second bearing element is a bushing.

37. A tensioner for tensioning a belt, comprising:
a housing having an arm;
a biasing element disposed within the housing operable to bias the arm;
a base releasably connected with the housing and cooperable with the housing to enclose the biasing element, wherein the base comprises a first connector having a non-circular configuration;
a shaft extending through the housing and biasing element, wherein the shaft comprises a second connector configured to mate with the first connector of the base to impede rotation of the shaft relative to the base while allowing axial displacement of the shaft relative to the base, wherein the second connector has a non-circular configuration.

38. The tensioner of claim 37 wherein the shaft comprises a second end configured to cooperate with a tool for tightening the tensioner.

39. The tensioner of claim 38 wherein the second end of the shaft comprises a pair of opposing parallel flat surfaces cooperable with a wrench to turn the shaft to tighten the tensioner.

40. The tensioner of claim 37 comprising a bearing element between the shaft and the housing to provide a low friction bearing surface between the shaft and the housing.

41. The tensioner of claim 40 wherein the bearing element is a bushing.

42. The tensioner of claim 40 comprising a second bearing element disposed between the housing and the base to provide a low friction bearing surface between the housing and the base.

43. The tensioner of claim 42 wherein the second bearing element is a bushing.

44. The tensioner of claim 37 wherein the biasing element is formed of a plurality of convolutions and is reversible so that in a first orientation the convolutions spiral in a first direction and in a second orientation the convolutions spiral in a second direction, wherein the tensioner comprises a reversible indicator operable to identify the first direction if the biasing element is in the first orientation and to identify the second direction if the biasing element is in the second orientation.

45. The tensioner of claim 44 wherein the indicator is cooperable with the biasing element to orient the indicator in the first direction when the biasing element is in the first orientation and is cooperable with the biasing element to orient the indicator in the second direction when the biasing element is in the second orientation.

46. The tensioner of claim 45 wherein the indicator is releasably connectable with the arm or the housing.

47. The tensioner of claim 45 wherein the indicator is cooperable with the biasing element to impede positioning the indicator to identify the first direction when the biasing element is in the second orientation.

48. The tensioner of claim 37 wherein the arm comprises a first connector and the housing comprises a second connector for releasably connecting the arm with the housing.

49. A tensioner for tensioning a belt, comprising:
a housing;
an arm connected to the housing;
a biasing element disposed within the housing operable to bias the arm in a first direction;
a base cooperable with the housing to enclose the biasing element;
a shaft extending through the housing and biasing element, wherein the housing is rotatable relative to the shaft and the shaft has a bore and a first end configured to mate with the base to impede rotation of the shaft relative to the base while allowing axial displacement of the shaft relative to the base; and
a fastener extending through the shaft for attaching the tensioner to a machine element.

50. The tensioner of claim 49 wherein the shaft comprises a second end having a surface adapted to cooperate with the fastener, such that tightening the fastener tightens the shaft against the base, which in turn tightens the base against the machine element.

51. The tensioner of claim 50 wherein the shaft comprises a stop for limiting the axial displacement of the shaft toward the base.

52. The tensioner of claim 51 wherein the shaft is configured such that upon tightening the fastener against the shaft, a gap remains between the second end of the shaft and the housing to permit rotation of the housing relative to the shaft.

53. The tensioner of claim 49 wherein the shaft comprises a second end configured to cooperate with a tool for tightening the tensioner.

54. The tensioner of claim 53 wherein the second end of the shaft comprises a pair of opposing parallel flat surfaces cooperable with a wrench to turn the shaft to tighten the tensioner.

* * * * *